INVENTORS
ALFRED S. GORAWSKI
HENRY A. SEESSELBERG
BY George [signature]
Agent

*INVENTORS*
ALFRED S. GORAWSKI
HENRY A. SEESSELBERG
BY George A. Sullivan
Agent

*INVENTORS*
ALFRED S. GORAWSKI
HENRY A. SEESSELBERG
BY George C. Sullivan
Agent

INVENTOR.
ALFRED S. GORAWSKI
HENRY A. SEESSELBERG
BY George C. Sullivan
Agent

United States Patent Office 3,351,255
Patented Nov. 7, 1967

3,351,255

TAPE TRANSPORT PRESSURE ROLLER ACTUATOR

Alfred S. Gorawski, White House Station, and Henry A. Seesselberg, South Plainfield, N.J., assignors to Lockheed Aircraft Corporation, Burbank, Calif.

Filed Sept. 15, 1965, Ser. No. 487,478
9 Claims. (Cl. 226—181)

ABSTRACT OF THE DISCLOSURE

A pressure roller actuator for tape recorders wherein the pressure roller is carried on a hinged arm and normally spring urged into pressure contact with a tape drive capstan. The hinged arm rides on an eccentric cam to selectively move the pressure roller between the capstan engaging position and a retracted position. A reciprocating drive motor is drivingly coupled to the eccentric cam through a one-way clutch for advancing the cam and an escapement clutch mechanism prevents retrograde movement of the cam. The motor control circuit includes a switch responsive to movement of the hinged arm from either of its two extreme positions for automatically de-energizing the drive motor.

This invention relates generally to tape transport mechanisms and more particularly to a low power, electrically controlled pressure roller actuator for magnetic tape recording and reproducing equipment.

In tape recorders of the type to utilize the teachings of this invention, one or more rotating capstans are provided to move the tape at a constant velocity during recording and reproducing modes of operation. The pressure rollers during these operating modes are spring urged against the capstans to confine the tape therebetween and cause it to be transported along its path at the peripheral speed of the capstans. During such other operating modes as fast forward or rewind, the pressure rollers must be disengaged from the capstans.

It is an object of this invention to provide a solenoid driven tape recorder pressure roller actuator having low average electrical power requirements and a large mechanical advantage (leverage) with independently adjustable spring means for generating the pressure roller force against the capstan.

Another object of this invention is to provide a tape recorder pressure roller actuator having latching mechanical coupling between the driving solenoid and the pressure rollers permitting cyclic reciprocating operation of the solenoid with precise positioning of the pressure rollers.

Another object of this invention is to provide a control circuit for solenoid driven tape recorder pressure roller actuators which is truly bistable so as to assure selective positioning of the pressure rollers in or out of engagement with the capstans and prevent intermediate positioning thereof by an operator acting inadvertently or otherwise.

Another object of this invention is to provide a tape recorder pressure roller actuator having a fast response time in the order of 25 to 100 milliseconds for operation to fully engage or disengage the capstan.

Still another object of this invention is to provide a tape recorder pressure roller actuator and control circuit which is well-suited to non-critical, low cost components and compact, small volume packaging.

Further and other objects will berome apparent from a reading of the following detail description, especially when considered in combination with the accompanying drawing wherein like numbers refer to like parts.

Figures 1, 4, 5:
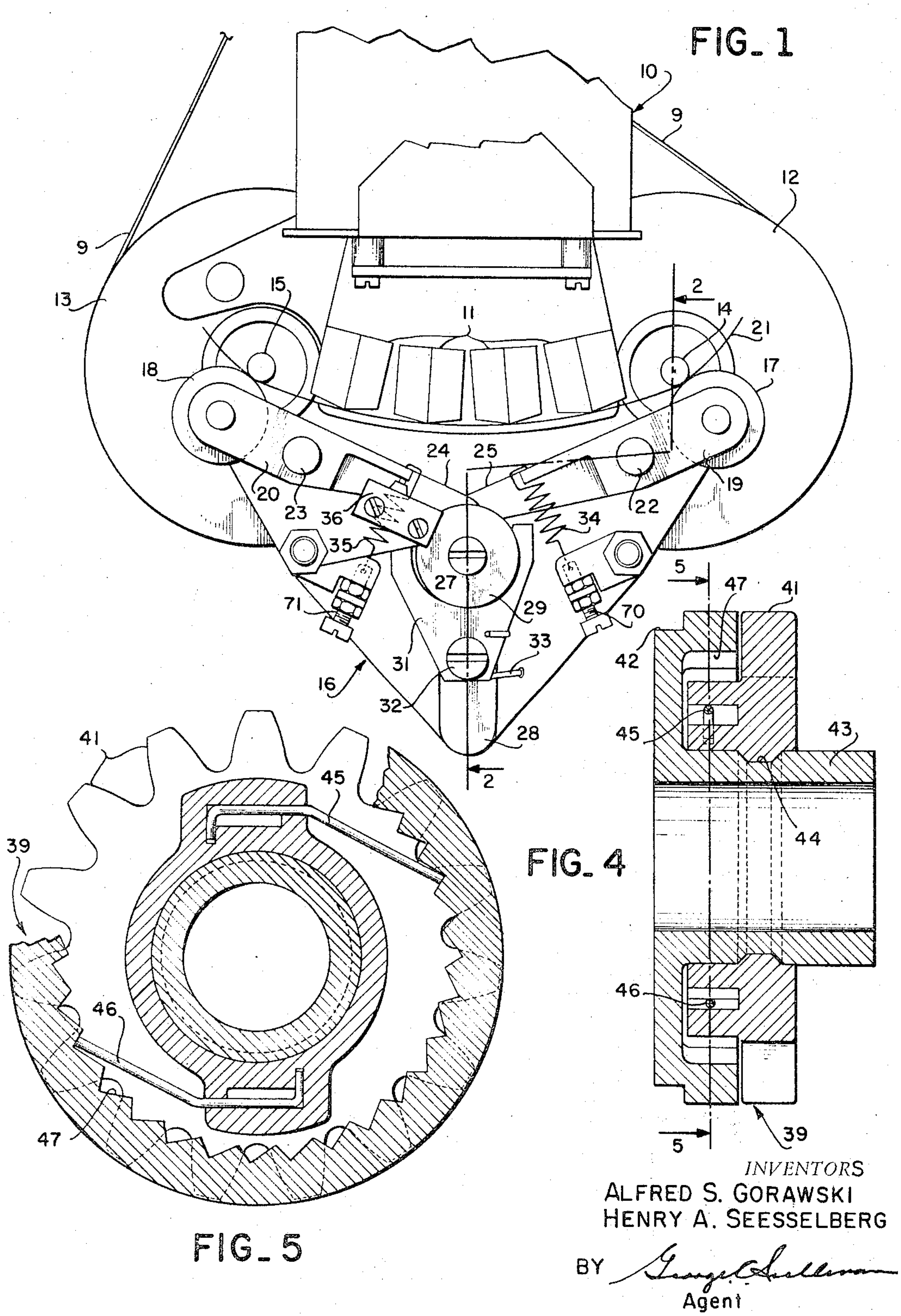
FIGURE 1 is a fragmentary plan view of a portion of a tape recorder showing the pressure roller actuator of this invention.
FIGURE 4 is a sectional side view showing the construction details of the ratchet drive gearing in the actuator.
FIGURE 5 is a view taken on line 5—5 of FIGURE 4.
Figure 2:
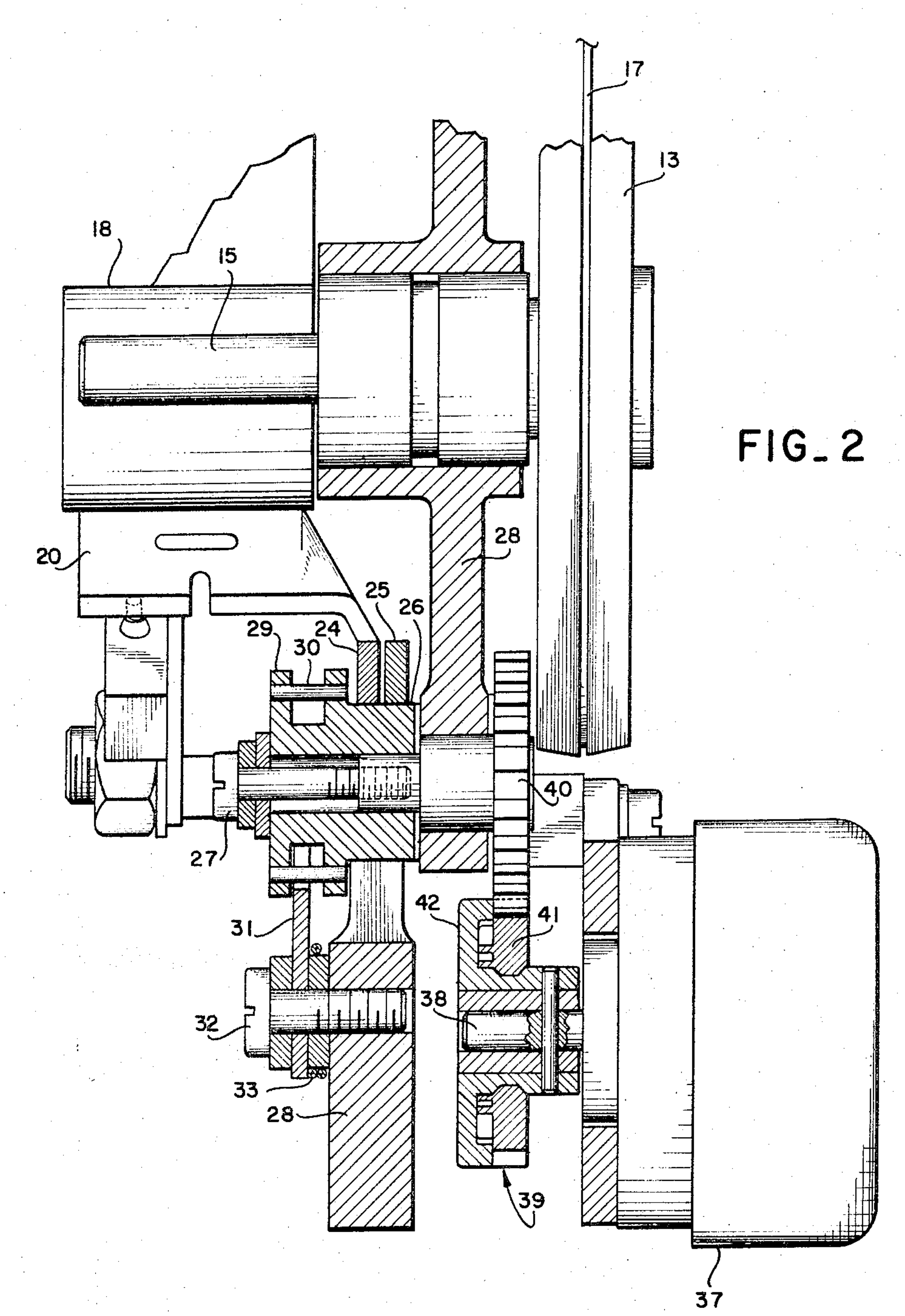
FIGURE 2 is a view taken approximately on line 2—2 of FIGURE 1.
Figure 3:
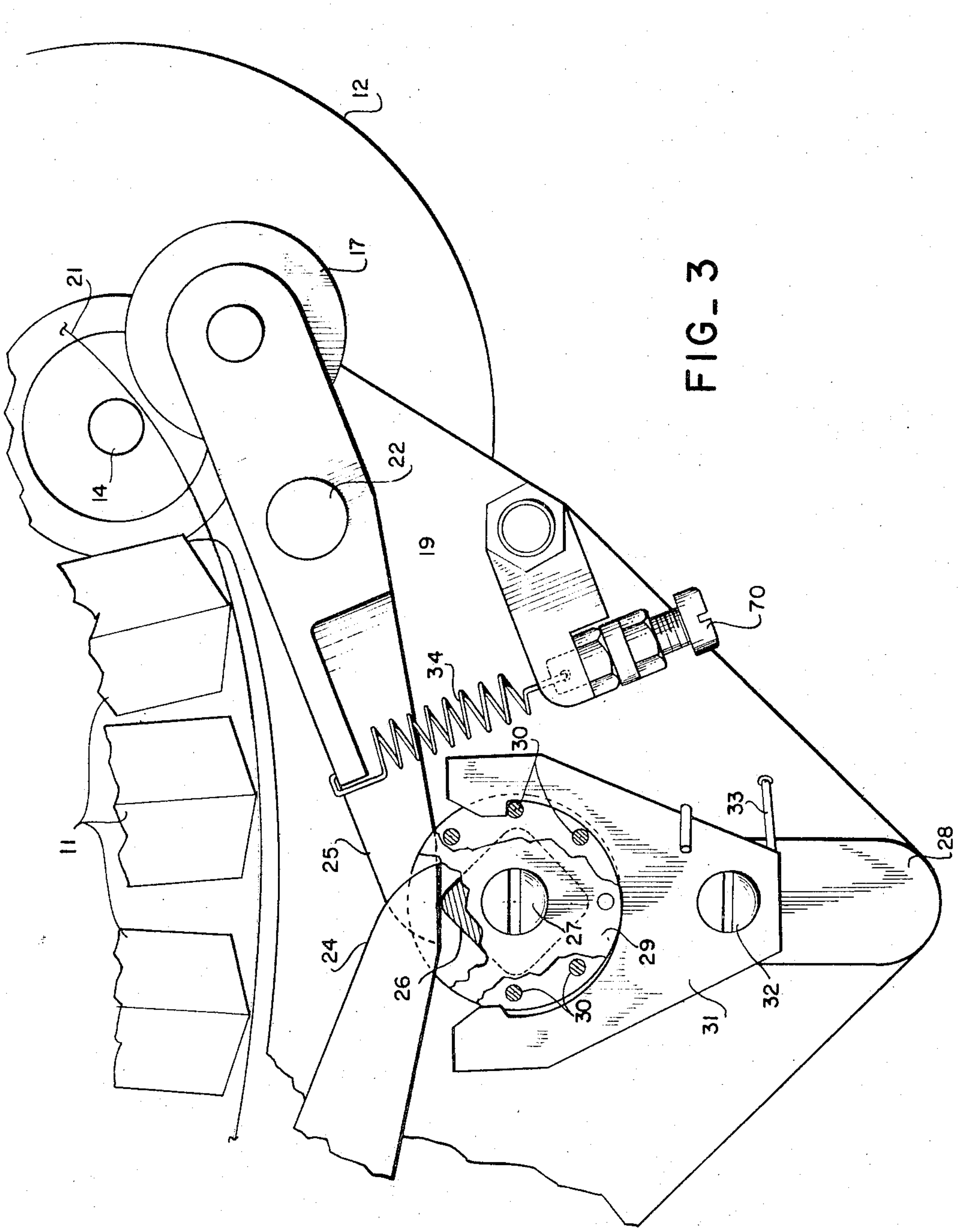
FIGURE 3 is an enlarged fragmentary plan view of the actuator showing the construction details of the escapement mechanism and pressure roller arm assembly.

Referring to FIGURES 1, 2 and 3, there is shown a portion of a tape recorder unit 10 including magnetic recording/reading/erasing heads 11, drive wheels 12 and 13 for capstans 14 and 15 and the pressure roller actuator mechanism 16. Belt 9 couples a suitable drive motor (not shown) with drive wheels 12 and 13 to rotate capstans 14 and 15, moving the tape past magnetic head 11 at a constant velocity.

Pressure roller actuator mechanism 16 comprises pressure rollers 17 and 18 carried on levers 19 and 20, respectively, as best shown in FIGURE 1 to selectively and in unison squeeze magnetic tape 21 between the pressure rollers 17 and 18 and their associated capstans 14 and 15. Levers 19 and 20 which support the pressure rollers are fulcrumed to rotate about their respective pins 22 and 23. The free ends 24 and 25 of levers 19 and 20 engage a generally square shaped eccentric cam 26 as best shown in FIGURES 2 and 3. Cam 26 is fixedly mounted on shaft 27 rotatably carried by frame 28. Secured to cam 26 is a pin wheel 29 forming part of a latching pin wheel escapement mechanism. Pin wheel 29 is provided with a plurality of pins 30 spaced around the outer periphery of the wheel approximately 45 degrees apart. Yoke 31 of the escapement mechanism pivots about pin 32 on frame 28 and cooperates with pin wheel 29 to complete the basic escapement mechanism. A spring 33 urges yoke 31 in a counter-clockwise direction about pin 32 (as viewed in FIGURE 3) so that, as pin wheel 29 rotates with cam 26 in a clockwise direction (also as viewed in FIGURE 3) the escapement mechanism will allow its pin wheel to continue rotating whereas the pin wheel is locked to prevent counter-clockwise retrograde movement each 45 degrees of rotation.

Tension springs 34 and 35, as shown in FIGURES 1 and 3, engage levers 19 and 20, respectively, to urge their free ends 24 and 25 against cam 26 so that, as the cam is rotated 45 degrees, pressure rollers 17 and 18 will be controllably moved between two extreme positions; one squeezing tape 21 against capstans 14 and 15 and the other a fully retracted position releasing the tape.

Referring to FIGURE 2, there is shown a cycling or reciprocating rotary solenoid 37, such as that manufactured by Ledex, Inc. of Dayton, Ohio, under their part number H–3126–023, suitably mounted on frame 28 and having an output shaft 38 on which is carried a ratchet drive gear mechanism 39. Ratchet drive gear 39 engages gear 40 on shaft 27 for effecting the clockwise rotation of cam 26 and pin wheel 29. Rotary solenoid 37 has a maximum shaft rotation on application of a driving voltage of slightly over 45 degrees. The elapsed time for the particular solenoid identified above to complete each cycle is typically in the neighborhood of 25 milliseconds. Hence, on application of the driving voltage to the solenoid, a pulse of a duration of about 25 milliseconds will result in cam 26 being rotated to either engage or disengage the capstan. Between each successive pulse, shaft 38 of the solenoid returns to its original starting position. The escapement mechanism comprising pin wheel 30 and yoke 31 as well as ratchet driver gear mechanism 39 permits cyclic operation of the solenoid while preventing retrograde movement of the cam. Further in this connection, the high points on cam 26 are arranged to lag slightly the latching position of pins 30 in the escapement so that the cam will not quite have reached top dead center during latching of the escapement.

Ratchet drive gear mechanism 39, as best shown in FIGURES 4 and 5, includes a spur gear 41 and a reentrant, internally toothed ratchet wheel 42. Sleeve 43 on ratchet wheel 42 is suitably grooved at 44 to lockingly receive gear 41 and allow free rotation between the gear and ratchet wheel, except as limited by spring pawls 45 and 46 carried on gear 41. Pawls 45 and 46 engage teeth 47 formed by the internal grooves in the ratchet wheel. As shaft 38 of solenoid 37 is caused to rotate in a counter clockwise direction by the application of a solenoid energizing voltage, ratchet wheel 42, which is secured to shaft 38, likewise rotates in a counter-clockwise direction, driving gear 41 with it by the action of spring pawls 45 and 46 acting against ratchet teeth 47. Counter-clockwise rotation of drive gear 41 is transformed into clockwise rotation of shaft 27. When the slightly over 45 degree limit of shaft rotation is reached by the solenoid, it will automatically return its shaft to the original starting rotational position to begin a new cycle by simply removing the actuating power momentarily. During this return movement of the solenoid shaft, ratchet wheel 42 rotates in a clockwise direction while shaft 27 and the associated cam 26 are held against retrograde movement by action of the escapement mechanism represented by pin wheel 30 and yoke 31.

Gear 41 and ratchet wheel 42, making up ratchet drive gear mechanism 39, are of a nylon-based material having slight resiliency such that gear 41 may for assembly be snapped into position on sleeve 43. While this detail construction for the ratchet drive gear mechanism is preferred in the sense that it provides a one-way clutch for the actuator assembly which is econmical to manufacture and highly suitable for the intended purpose, it should of course be understood that any type of one-way clutch capable of performing the functions of the ratchet drive gear mechanism may be substituted in the actuator assembly without departing from the principal teachings of this invention.

Figure 6:
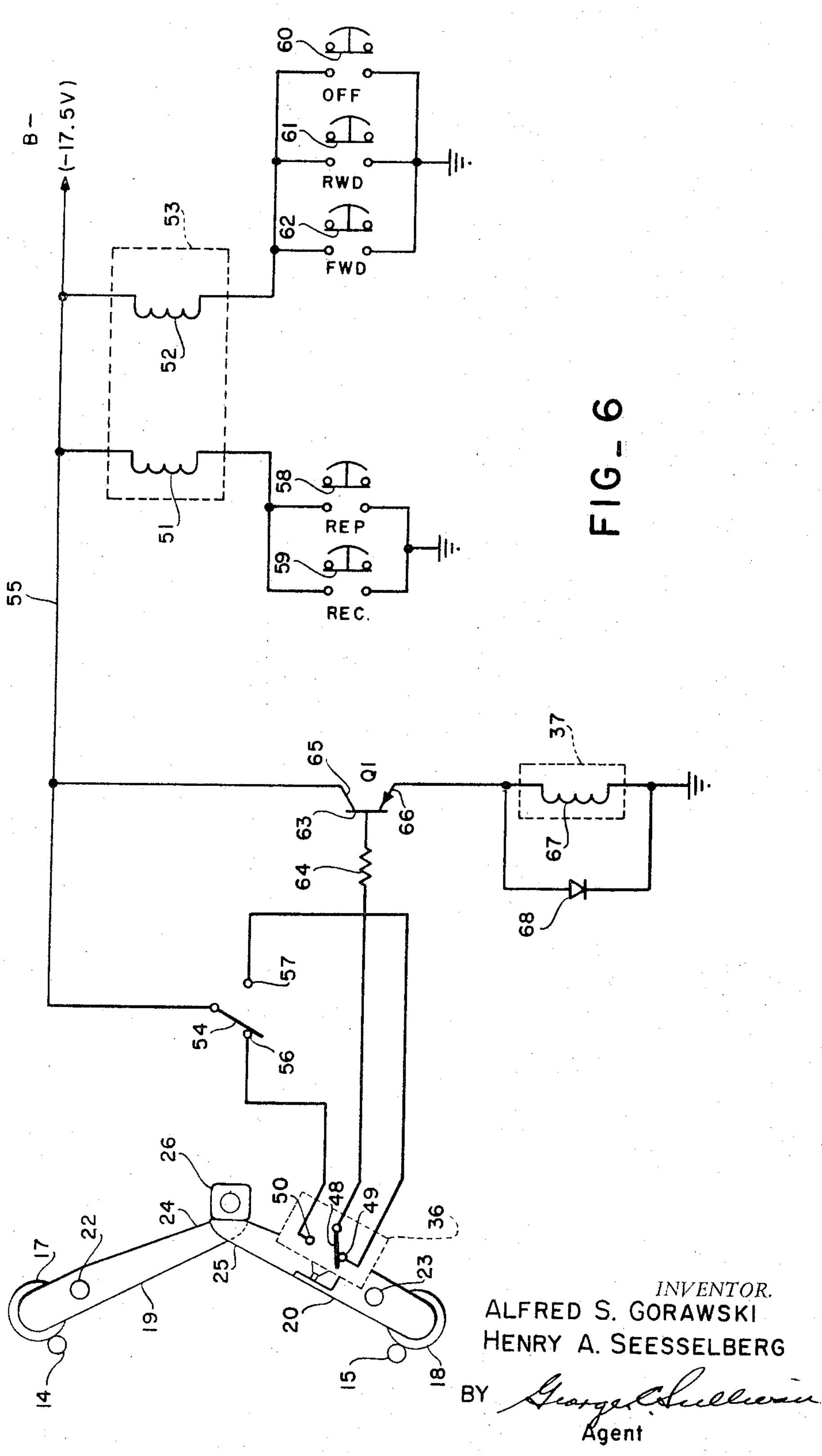
FIGURE 6 shows schematically the electrical control circuit forming part of the pressure roller actuator.

As shown in FIGURES 1 and 6, a microswitch 36 suitably mounted on frame 28 is arranged adjacent pressure roller lever 20 for actuation on movement of lever 20 between the retracted and capstan engaging positions of the pressure roller. Microswitch 36 is of the double-pole, single-throw delayed action type such as that manufactured by Honeywell, Inc., Microswitch Division, Freeport, Ill., and marketed under their part number 1SM1T2. Movable contact 48 of microswitch 36 engages selectively either fixed contact 49 or fixed contact 50, depending on the axial position of its actuating pin. As shown in FIGURE 6, the position of movable contact 48 illustrates the circuit condition wherein the pressure rollers are engaging the capstans. Electrical power identified by way of illustration as a —17½ volt B— supply is coupled to one or the other of contacts 49 or 50 of microswitch 36, depending upon which coil, 51 or 52, of a double coil latching relay 53 such as Potter Brumfield Relay SL 11D is energized. The movable contact 54 of latching relay 53 is connected to the electrical supply through lead 55 and couples one or the other of the microswitch fixed contacts 49 and 50 to the supply voltage through latching relay fixed contact 56 or 57.

Coils 51 and 52 of latching relay 53 are both connected to the source of electrical potential in parallel; coil 51 being selectively grounded through "reproduce" and "record" manual push button switches 58 and 59, respectively, while coil 52 is selectively grounded through "off," "rewind" or "fast forward" push button switches 60, 61 or 62.

Movable contact 48 of microswitch 36 is coupled to the base 63 of a switching transistor Q1 through a small current limiting resistor 64. Transistor Q1 may be of the 2N2552 type and have its emitter electrode 65 connected to the voltage source while the collector electrode 66 is connected to ground through coil 67 in rotary solenoid 37 and preferably also an arc suppressor diode 68 such as an IN2069 connected across the coil.

As stated above, the circuit of FIGURE 6 is drawn with the pressure roller actuator in the capstan engaging position. When the "fast forward," "rewind" or "off" push button switch 60, 61 or 62 is depressed, coil 52 of latching relay 53 is energized driving the movable contact 54 into engagement with contact 57. This applies the 17½ volts to the base of Q1 (less a small drop across current limiting resistor 64). Since Q1 is arranged as a common collector amplifier with a voltage gain of 1, nearly 17½ volts appear across coil 67 of solenoid 37. Solenoid 37 is thusly driven to throw the pressure rollers out of engagement with the capstans. When the pressure rollers are fully retracted, movable contact 48 of microswitch 36 is moved to engage contact 50, its alternate position preventing the supply voltage from reaching the base of Q1. Now, if the "reproduce" or "record" push button switch 58 or 59 is depressed, movable contact 54 is moved to engagement with contact 56 as the alternate coil 51 of latching relay 53 is momentarily energized. This applies the supply voltage again to the base of Q1, causing it to become conductive and energize coil 67 of solenoid 37. This time, energizing of coil 67 in the rotary solenoid drives the pressure rollers to engage the capstans, completing the operating cycle.

The elapsed time between depression of a push button and actuator operation is determined by the time for arms 19 and 20 to traverse their operating distance. In practice, this is about 25 to 100 milliseconds. This time must be held small to keep Q1 from overheating. In the device disclosed, the average power by actual test has been held to less than one watt, although the peak (switching) power is in the neighborhood of 150 watts. In this connection, it should be noted that, once the operator depresses one of the push button switches, he has no control over the length of current application, as it is the microswitch 36 in the circuit which cuts the biasing current off Q1 when operation is complete. Thus, the circuit is truly bi-stable, assuring that the actuator will hold to either of its two extreme positions and the operator cannot coax it into an intermediate state. The control circuit described also offers the advantage that only a very small current is required to flow through microswitch 36 while the bulk of the driving current for actuating rotary solenoid 37 travels directly from the supply source to the solenoid actuating coil 67 through transistor Q1.

It should be further noted that the pressure roller actuator described herein does not rely on the rotary solenoid to supply the pressure roller force against the capstan. The rotary solenoid is employed merely for the purpose of positioning the pressure roller to either of two extreme positions, a retracted position displaced from the capstan and an operative position pressing against the capstan and confining the tape therebetween to be transported at the peripheral capstan velocity. The pressure roller levers 19 and 20 are capable of providing a large mechanical advantage and, in cooperation with tension springs 34 and 35, determine the force supplied by the pressure rollers on the capstan. The magnitude of the force may be readily varied by adjustment of the tension in springs 34 and 35 through any suitable means such as set screws 70 and 71, as illustrated in FIGURE 1.

While a specific embodiment of the invention has been shown and described, it is for purposes of illustration rather than limitation and it should be understood that certain alterations, modifications and substitutions may be made to the instant disclosure without departing from the teachings of the invention as defined by the spirit and scope of the appended claims.

We claim:

1. A pressure roller actuator for tape recorders and the like having a capstan drive comprising, a frame, a pressure roller, arm means carrying said roller and hinged on said frame establishing a path of roller movement relative to said capstan, an eccentric cam rotatably carried on said frame for engaging said arm means and moving said roller away from said capstan, spring means urging said arm toward said capstan and in engagement with said cam means, said spring means being adjustable to regulate the force the roller may exert against the capstan, escapement means connecting with said cam and limiting retrograde movement thereof, ratchet drive means coupled to said cam, manual switch means for energizing said drive means, and automatic switch means deenergizing said drive means in response to arm movement to at least one extreme position.

2. A device as defined in claim 1 wherein said eccentric cam is generally square.

3. A device as defined in claim 1 wherein said ratchet drive means includes a reciprocating rotary solenoid requiring re-cycling to move said pressure roller from one extreme position to another.

4. A device as defined in claim 1 including a transistor switch for coupling power to said drive means and being biased controlled through said automatic switch means.

5. A device as defined in claim 4 wherein said automatic switch means includes a microswitch arranged adjacent said arm means for actuation in response to movement of said arm.

6. A pressure roller actuator for tape transport systems having a capstan drive comprising, a frame, a pressure roller, arm means carrying said pressure roller and secured to said frame for swinging movement in a plane generally normal to the capstan axis of rotation, spring means urging said arm means and pressure roller to move toward said capstan, cam means rotatably carried on said frame to engage said arm means in opposition to said spring means and move said arm means and pressure roller away from said capstan, drive means coupled to said cam means for rotating said cam means when said drive means is energized, conductor means connecting with a source of electrical potential, and control means selectively coupling said conductor means with said drive means to energize the drive means, said control means including switch means automatically de-energizing said drive means in response to movement of said arm means to at least one extreme position relative to the capstan.

7. A device as defined in claim 6 wherein said drive means is of the reciprocating type, and said cam means includes a one-way clutch allowing free movement of said cam means in only one direction and said drive means includes a one-way clutch allowing free movement of said drive means only in the opposite direction.

8. A pressure roller actuator for tape transport systems having a capstan drive comprising, a frame, a pressure roller, arm means carrying said pressure roller and secured to said frame for swinging movement in a plane generally normal to the capstan axis of rotation, spring means urging said arm means and pressure roller to move toward said capstan, cam means rotatably carried on said frame to engage said cam means in opposition to said spring means and move said arm means and pressure roller away from said capstan, reciprocating drive means coupled to said cam means for rotating said cam means when said drive means is energized, said cam and drive means including clutch means allowing movement of said cam means with said drive means only in one direction, conductor means for connecting with a source of electrical potential, a transistor switch coupling said drive means to said conductor means for energizing said drive means only when the transistor switch is biased to conduct current therethrough, mechanical switch means responsive to movement of said arm means for actuation and connecting with said conductor means and with said transistor switch, and manually operable switch means interposed in said conductor means and ahead of said mechanical switch means whereby the biasing current circuit to said transistor switch is closed only by said manually operable switch means and opened only by said mechanical switch means.

9. In a tape recorder having a capstan drive, a movable pressure roller supporting arm and electrical drive means for controlling movement of said arm, a control circuit for the drive means comprising, conductor means for connecting to a source of electrical potential, electrically operable switch means coupling said drive means to said conductor means for supplying energizing current to said drive means when said electrically operable switch means is closed, manually operable switch means coupled to said conductor means and to said electrically operable switch means and operative only to close said electrically operable switch means, and mechanically operable switch means responsive to movement of the movable pressure roller supporting arm for actuation and coupled to said conductor means and said electrically operable switch means and operative only to open said electrically operable switch means.

References Cited

UNITED STATES PATENTS 3,148,819 9/1964 Frick ------------ 226—186 X

M. HENSON WOOD, Jr., *Primary Examiner.*

R. A. SCHACHTER, *Assistant Examiner.*